Patented Nov. 14, 1950

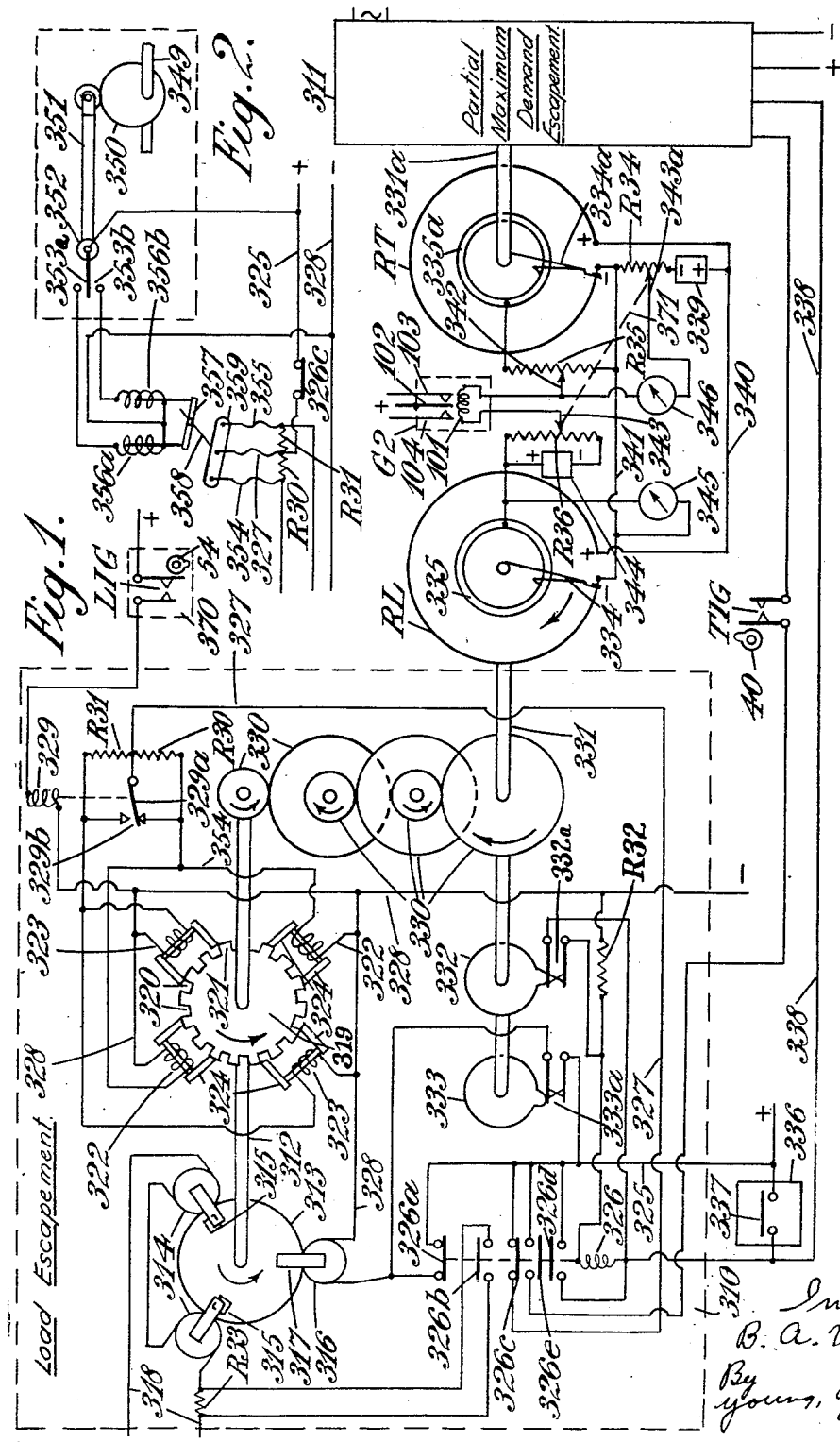

2,530,214

UNITED STATES PATENT OFFICE 2,530,214

APPARATUS FOR COMPARING THE RATES OF OPERATION OF TWO CONTACT DEVICES

Bernard André Vuille, Watford, England, assignor to Watford Electric & Manufacturing Company Limited, Watford, England, a British company Application August 14, 1944, Serial No. 549,431
In Great Britain August 6, 1943

8 Claims. (Cl. 175—183)

This invention relates to apparatus for controlling an electric power load in such manner as to prevent the energy consumed by a consumer during each of a series of metering periods exceeding a maximum demand permitted by the electric-supply authority for each such metering period. In Coates and Vuille United States Patent No. 2,348,058 there is described such an apparatus which comprises means for measuring and integrating the instantaneous load taken by the consumer to obtain the energy consumed at each moment of a metering period, means for comparing the energy consumed, or a function thereof, with a partial maximum demand, or a function thereof, that increases at a uniform rate, corresponding to a standard load, from an initial value at the beginning of each period to equal the maximum demand at the end of the period, which means determines whether the energy consumed or the partial maximum demand is the greater, and control means controlled by the comparing means and arranged to permit the instantaneous load taken to fluctuate freely so long as the energy consumed does not exceed the partial maximum demand but to reduce the instantaneous load taken to the standard load when the energy consumed equals the partial maximum demand. The comparing means is in the form of an electrical bridge system and in one form comprises two potentiometers connected in parallel and of which one has a movable contact that is adjusted at a uniform rate so that its potential corresponds to the partial maximum demand and the other has a movable contact that is adjusted at a rate corresponding to the instantaneous load taken so that its potential corresponds to the energy consumed. A polarized relay is connected between the movable contacts for operation by the potential difference between the contacts to control the control means and the bridge can be adjusted for a required initial value of the partial maximum demand and of the standard load by means of adjustable resistances in series with the first potentiometer. This form of bridge is liable to erroneous operation owing to variation in the contact resistance of the adjustable resistances and it was therefore preferred to use a Wheatstone bridge in the comparing means. Whichever form of bridge is used, it comprises movable contacts which are advanced by means of electrically actuated stepping devices operated by series of electrical impulses and which are reset at the end of each metering cycle, the resetting means including an electric motor.

One object of this invention is to provide improved comparing means for an apparatus of the above kind.

Another object of this invention is to provide a comparing bridge comprising two potentiometers that can be adjusted in an improved manner for a required initial value of the partial maximum demand or a required standard load.

A further object of this invention is to provide an improved comparing bridge in which each movable contact of the bridge is advanced under the control of an electro-magnetic escapement mechanism that escapes at a rate determined by the rate of a series of electrical impulses transmitted to it.

Yet a further object of this invention is to provide an improved electro-magnetic escapement mechanism which escapes one step each time an electric impulse is transmitted to it.

Other objects of this invention will be apparent from the following description of a specific embodiment taken in connection with the accompanying drawings and its scope will be pointed out in the appended claims.

In the drawings:

Figure 1 shows diagrammatically a comparing mechanism comprising two escapement mechanisms and a comparing bridge controlled by them. The mechanism shown in Figure 1 is arranged for substitution in the mechanism shown in Figures 1a, 1b and 1c of Patent No. 2,348,058, and Figure 2 shows diagrammatically a modification of the mechanism shown in Figure 1.

As shown in Figure 1, the mechanism comprises two escapement mechanisms 310 and 311 which are identical so that only the mechanism 310 has been shown in detail, the mechanisms 311 being shown by a rectangle. The escapement mechanism 310 is controlled by contacts LIG operated by a cam 54 which corresponds to the cam 54 shown in Figure 1a of Patent No. 2,348,058 and is rotated at a speed corresponding to the instantaneous load taken by a consumer as described in the aforesaid patent by the mechanism shown at the top of Figures 1a and 1b of the aforesaid patent. The contacts LIG are, thus, closed intermittently at a rate corresponding to the instantaneous load. This mechanism is a load meter and is indicated by the rectangle 370 in Figure 1. The escapement mechanism 311 is controlled by contacts TIG which are closed intermittently at a uniform rate by a cam 40 that rotates at a uniform speed as described in the aforesaid patent where the cam and contacts are identified by the same references.

The present mechanism is substituted for the mechanism shown in Figures 1a and 1b of the aforesaid patent as being controlled by the contacts LIG and TIG, the mechanism omitted including the shafts 98L and 98T and associated parts, and the bridge RL, RT, RX, RX1 and RM; the galvanometer relay G2 of the prior mechanism is retained in the present mechanism and controls the relay coils CL and CR as desribed in the aforesaid patent. It should also be mentioned that the control circuits shown in Figure 1c of the aforesaid patent are omitted when the present mechanism is employed.

The escapement mechanism 310 comprises a spindle 312 mounted to rotate in suitable frame (not shown) and carrying an induction disc 313. Two spaced electro-magnets 314 having shaded poles 315 co-operate with the disc and are energised by alternating current over lines 318 so that the magnets and the disc form an induction motor driving the spindle 312 in one direction as shown by the arrow. A third electro-magnet 316 has a plain pole 317 co-operating with the disc and is energized by direct current as explained later so that it acts to brake the disc. With all three magnets energised, there is a resultant torque biassing the spindle to rotate in the direction shown by the arrows. The spindle 312 also carries a disc 319 which has equally-spaced rectangular slots 320 around its periphery so as to provide square cut teeth 321 having the same circumferential width at their ends as the slots to form a toothed wheel. A pair of diametrically opposed magnets 322 and a similar pair of magnets 323 are mounted round the toothed wheel or disc 319 and operate as escapement magnets. Each magnet 322 or 323 has two poles 324 which the ends are less in width than the ends of the teeth 321 and which all extend close to the periphery of the disc 319 so that the magnetic circuit for each magnet 322 or 323 is from one of its poles 324 through the disc 319 to the other pole. The poles 324 of each magnet 322 or 323 are so spaced that all four poles of both magnets 322 will register simultaneously with the teeth 321 (or toothspaces 320) of the disc at the same time as the four poles 324 of the magnets 323 register with tooth-spaces 320 (or teeth 321) of the disc.

The magnets 322 and 323 are connected in a circuit which extends from a positive supply line 325 through relay contacts 326c and a line 327 and then in parallel through a resistance R30, a line 354 and the magnets 322 to a negative supply line 328, or through a resistance R31, and the magnets 323 to the line 328. As shown the resistance R30 is shunted by closed contacts 329a so that the magnets 322 are fully energised, while the resistance R31 is in series with the magnets 323 which are only partially energised. The magnets 322 will thus hold the disc 319 in the position shown with the poles 324 of the magnets 322 in register with teeth 321. If the magnets 323 are now energised fully and the magnets 322 are partially de-energised the former will attract adjacent teeth under their poles and the disc 319 will move one step, that is, one half tooth-pitch, in the direction shown by the arrow. The disc rotates in this direction partly because it is biassed so to do by the induction motor 313—314—315 and also for the following reason. Since the poles 324 are smaller than the teeth 321 and the disc 319 is biassed to rotate in one direction, the teeth will tend to lead the poles of the magnets 322 as shown and the poles of the magnets 323 will each be nearer than the adjacent incoming tooth than it is to the adjacent outgoing tooth. The reduced magnetic flux in the poles of the partly energised magnets 323 will thus tend to attract the adjacent incoming teeth 321 under those poles and, thus, to ensure that the spindle will be stepped round in the correct direction and will not be reversed owing to faulty operation.

When the contacts LIG close, they complete a circuit from the positive supply through the contacts LIG and a relay coil 329 to the negative supply to energise the coil 329 which opens the contacts 329a and closes contacts 329b to shunt the resistance R31. The magnets 323 are then fully energised and the magnets 322 only partially energised. The magnetic fluxes are then such that the attraction of the poles of the magnets 323 on the adjacent trailing teeth 321 is sufficient to cause the disc 319 to move one step and bring those teeth into register with the poles of the magnets 323. When the contacts LIG reopen, the relay coil 329 is de-energised and its contacts return to the position shown so that the magnets 322 are fully energised while the magnets 323 are only partially energised and the disc 319 is moved on a second step.

The disc 319 is, thus, advanced by one step each time the contacts LIG open or close and its rate of advance is proportional to the rate at which the contacts LIG are operated and, thus, to the load taken by the consumer. It will be understood that the disc 319 is advanced by the pair of magnets 322 and the pair of magnets 323 alternately and it is not essential to energise the other pair partially as described above. It is advisable to do this both to ensure that the disc 319 is not turned backwardly as explained above and because the partially energised magnets reduce the speed of rotation of the disc which might otherwise move through more than one step at a time to produce a faulty result. Such faulty operation is further prevented by the brake magnet 316 co-operating with the induction disc 313. The magnet 316 is energised over a circuit from the supply line 325 through contacts 326a and the magnet 316 to the line 328.

The spindle 312 drives, through reduction gear train 330, a second spindle 331 which carries cams 332 and 333 for operating contacts 332a and 333a and also carries a contact arm 334 which connects a ring 335 to a resistance RL which is in the form of a thick resistance wire bent nearly to a circle as shown. The contact arm 334 and resistance RL form a load potentiometer of which the contact arm is initially at the negative end of the resistance but is stepped round at a rate corresponding to the load taken so that its potential at any time in a metering period is proportional to the energy consumed at that time. The contact arm 334 is reset to its initial position at the end of each metering period by the following means.

A time switch 336 of any suitable form is installed which closes contacts 337 momentarily at the end of each metering period to complete a circuit from the supply line 325 through the contacts 337, a relay coil 326 and a resistance R32 to the line 328. The coil is energised and closes contacts 326d in parallel with the contacts 337 to hold itself energised and also opens the contacts 326c in series with the magnets 322 and 323, to de-energise them, and the contacts 326a in series with the brake magnet 316 to de-energise it. The coil also closes contacts 326b to shunt out a resistance R33 which is in series with the magnets 314 so that the magnetising current for these magnets is increased and they drive the disc 313 at high speed. The escapement mechanism is thus driven forwardly and turns the arm 334 rapidly towards its initial position shown in the drawings.

Just before the arm 334 reaches its initial position, the cam 333 recloses the contacts 333a which opened as soon as the arm 334 left its initial position. These contacts are in parallel with the contacts 326a and their closure re-energises the brake magnet 316 which retards escapement mechanism. Shortly after, the cam 332 recloses the contacts 332a which are in parallel with the coil 326 to shunt it so that it is de-energised and its holding contacts 326d reopen. The contacts 326b then reopen and the contacts 326c reclose to restore the circuits to normal.

The spindle 331a of the escapement mechanism 311 carries a contact arm 334a which connects a ring 335a to a resistance RT and is adjusted from the negative end of the resistance RT at a uniform rate (since the contacts TIG controlling the mechanism 311 operate at a constant speed) so that its potential corresponds to the partial maximum demand at any time in a metering cycle and increases at a rate corresponding to the standard load. Initially the contact arm 334a is at a potential that will be referred to as zero potential and this corresponds to the initial value of the partial maximum demand. The escapement mechanism is reset at the end of each metering period under the control of the contacts 337 by a connection 338 from those contacts.

The potentiometer resistances RL and RT are connected in parallel across a source of electricity 339 to form a bridge, the positive ends being connected to the positive terminal of the source 339 by a line 340 and the negative ends to the negative terminal of the source by a line 341 and a potential-divider R34. A galvanometer relay G2 is connected between the contact rings 335 and 335a in the following manner so as to operate in accordance with the state of balance of the bridge.

One end of the coil 101 of this relay G2 is connected to a contact 342 adjustable along a resistance R35 which is connected between the ring 335a and the line 341 to form a potential divider which divides the potential of the ring 335a and contact arm 334 so that the potential of the contact 342 is any desired fraction from unity downwards of the potential of the arm 334a, which latter potential corresponds to the partial maximum demand at the greatest standard load within the capacity of the apparatus. If the apparatus is required to operate with a standard load that is, say, two-thirds of the greatest load within its capacity, the contact 342 is adjusted so that the resistance between it and the line 341 is two-thirds of the total resistance R35. This adjustment also determines the increase of the partial maximum demand during each metering cycle since the arm 334a moves at a uniform rate and its potential is the same at the end of each metering period.

The other end of the coil 101 is connected to a contact 343 adjustable along a resistance R36 that is connected across a source of electricity 344 as a potential divider and the positive terminal of this source is connected to the ring 335. The contact 343 thus has a negative potential with respect to the contact arm 334 and this potential can be varied by adjusting the contact 343 along the resistance R36 until it corresponds to the initial value of the partial maximum demand.

Initially the contact arms 334 and 334a are in the position shown and have zero potential. The contact 342 also has zero potential but the contact 343 is a negative potential corresponding to the initial value of the corresponding partial maximum demand and the coil 101 is subjected to a potential difference of one polarity and moves a contact 102 to engage a contact 103.

This negative potential on the contact 343 corresponds to the zero value of the energy consumed and the zero potential on the contact 342, which is positive with respect to the contact 343, corresponds to the initial value of the partial maximum demand.

The potential on the contact 342 increases at a uniform rate corresponding to the required standard load while the potential of the contact 343 increases at the same rate as the potential of the contact 334 to correspond with the energy consumed. When the energy consumed equals the partial maximum demand, the contact 342 and 343 will be at the same potential and there will be no current through the coil 101. If the energy consumed exceeds the partial maximum demand, the contact 343 will be positive with respect to the contact 342 and the coil 101 will be energised to move its contact 102 to engage a contact 104.

The relay G2 controls mechanism including the relays CL and CR described in the aforesaid prior patent and shown in Figure 1b thereof which permits the load taken to fluctuate so long as the contact 102 engages the contact 103 but restricts the load taken so that it cannot exceed the standard load when the contact 102 engages the contact 104.

In practice the contacts 342 and 343 are adjusted when the apparatus is installed to suit the particular maximum demand permitted by the supply authority and the operating conditions and the installation. It will be seen that the apparatus can be readily adjusted for a required initial value of the partial maximum demand and of the standard load.

It should be noted that the rate of advance of the arm 334 for a given load is the same however the apparatus is adjusted so that the movement of the arm 334 from one end of the resistance RL to the other always represents the same consumption of energy. The bridge cannot, therefore, be adjusted for a maximum demand greater than that amount of energy but can be adjusted for any lower maximum demand. When the bridge is adjusted for such lower maximum demand, only the portion of the resistance RL corresponding to this maximum demand is used and it would be inefficient to use too small a proportion of this resistance so that there is, in practice, a lower limit to the maximum demand for which the bridge can be adjusted with efficiency. The bridge is, thus, adjustable over a range of maximum demand but the range can be changed by changing the gear ratio of the gear train 330 in the escapement mechanism 310 so as to increase or decrease the rate of advance of the arm 334 for a given load and thus to decrease or increase respectively the upper and lower limits of maximum demand within which the bridge can be adjusted. This merely involves the manufacture of several alternative and interchangeable gear trains and the selection of the most suitable one for a particular installation. For this purpose two meshing gears in the train are mounted so that they can readily be removed and replaced by other gears of different sizes by the user of the apparatus.

An advantage of the arrangement is that the contact resistance of the contacts 334, 334a, 342 and 343 is in the circuit through the galvanometer relay coil 101 so that variations in this resistance will affect the magnitude of the current through the coil but not its direction which is determined solely by the potentials at the points on the resistances RL and RT which the arms 334 and 334a engage.

In order to provide a visual check on the operation of the apparatus, the magnitude of the energy consumed and of the partial maximum demand at each moment in the metering period can be indicated by means of meters 345 and 346. The meter 345 indicates the energy consumed and is connected between the ring 335 and the line 341 so that it is subjected to a potential corresponding to the energy consumed. The meter 346 indicated partial maximum demand and is connected between the contact 342 and an adjustable tapping 343a on the potential divider R34. The potential across this meter is thus the sum of the potential drop between the contact 342 and the line 341 and the potential drop between the line 341 and the tapping 343a on the resistance R34 and this tapping mechanically coupled is indicated by the dotted line 371 to the contact 343 is adjusted so that the potential drop between the line 341 and its tapping 343a corresponds to the initial value of the partial maximum demand, that is equals the negative potential on the contact 343 in the initial position of the apparatus.

In one bridge that has operated satisfactorily, the potential provided across the lines 340 and 341 is 0.75 volt and that across the resistance R36 is 0.25 volt. The resistances RL and RT have a total resistance of 0.1 ohm, the resistances R34 and R36 are each 0.033 ohm and the resistance R35 is 15 ohms. It will be noted that the resistances RL and RT are of low value and can be formed as thick curved wires so that the potential gradient along each of them will not vary due to its expansion and contraction due to temperature as might be the case if a wound resistance were used.

In some cases it may be desirable to measure the load taken by the known type of meter that comprises a spindle 349 (Figure 2) that rotates at a speed corresponding to the load. The spindle carries a cam which oscillates a lever 351 about a pivot 352 and the lever closes contacts 353a and 353b alternately. So long as there is a load, the contacts 353a and 353b will close alternately at a frequency corresponding to the load and will thus operate in a similar manner to the relay contacts 329a and 329b but the operation is not similar when there is no load, since either the contacts 329a or the contacts 329b will be closed, while the cam 350 may stop in such a position that the contacts 353a and 353b are both open. For this reason it is not possible to connect the contacts 353a and 353b directly to the magnets 322 and 323 through the lines 354 and 355 since all four magnets 322 and 323 would be de-energised if the cam 350 were to stop in such position that the contacts 353a and 353b were both open. The spindle 312 (Figure 1) would then be rotated continuously although it ought to be stationary.

The contacts 353a and 353b are, therefore, connected to two electromagnets 356a and 356b respectively so that the magnet 356a is energised by the closure of the contacts 353a and the magnet 356b by the contacts 353b. The magnets co-operate with a common steel armature 357 which is carried by a spindle 358 to pivot about the axis of the spindle. The spindle 358 carries a mercury switch 359 which connects the line 327 to either the line 354 or the line 355. Assuming that the contacts 353a are closed, the magnet 356a will rock the armature 357 to the position shown and the lines 327 and 355 will be connected by the switch 359. The armature 357 is magnetised and attracted should the cam 350 come to rest in the position shown after the contacts 353a open but before the contacts 353b close. Thus the circuit through the line 355 will be maintained. When the contacts 353b next close, they energise the magnet 356b which attracts the armature 357 with sufficient force to overcome the attraction of the magnet 356a for the armature so that the armature is rocked and reverses the switch 359 to connect the line 327 to the line 354. Since the attraction of the magnet 356b will increase and that of the magnet 356a will diminish as the armature rocks, it will move and rock the switch 359 with a snap-over action and this is advantageous.

The arrangement shown in Figure 2 should also be used when the meter includes change-over contacts, such as the contacts 353a and 353b, that take longer to change over from one setting to the other than the time required for the disc 319 to move half a tooth-pitch even if the contacts cannot remain in mid-position.

The energy consumed during the short interval required to reset the arm 334 is not included in the total energy consumed during the following metering period. This introduces an error causing overconsumption. The length of the reset interval varies with the angle through which the arm 334 moved during the preceding metering period and is long when that angle is small since the arm is reset forwardly and then has longer to travel during the reset. The reset interval for the arm 334a, on the other hand, is of constant duration and is never longer than the reset interval for the arm 334. The circuit through the contacts TIG includes contacts 326e that are opened when the coil 326 is energised and reclose when the coil is de-energised on the arm 334 being reset. Thus no impulses can be transmitted to the escapement mechanism 311 through the contacts TIC while the arm 334 is being reset and the advance of the arm 334a is delayed until the end of the reset interval for the arm 334. The maximum demand represented by the position of the arm 334a at the end of the metering period is thus short of the true permitted maximum demand by the product of the standard load and the duration of the preceding reset interval and this would exactly compensate for the error referred to above if the load during the reset interval exactly equalled the standard load. To allow for the load being greater than the standard load during the reset interval, the bridge is adjusted for a maximum demand slightly less than the true maximum demand allowed by the supply authority to provide a safety margin so that the error will result in underconsumption and not overconsumption of energy. The risk of the maximum demand being exceeded is thus prevented partly by a fixed safety margin and partly by an automatic reduction in the maximum demand represented by the position of the arm 334a in accordance with the duration of the reset interval.

I claim:

1. In an apparatus of the class described, the combination of two potentiometers connected in parallel and having each a movable contact, a constant-speed motor-device coupled to the contact of one potentiometer to move it from one end thereof at a uniform rate, a motor-device operable at a rate varying with an electric load coupled to the contact of the other potentiometer to move it from one end thereof at a rate varying with said electric load, an electrical connection between the ends of the potentiometers, means for resetting both contacts to their initial positions at the end of each of a series of periods, means for applying a potential across the potentiometers, a potential divider having an adjustable contact and connected between the contact of one potentiometer and the end thereof from which the contact was advanced, and means responsive to a difference of voltage connected between the contact of the potential divider and the contact of the other potentiometer.

2. In an apparatus of the class described, the combination of two potentiometers connected in parallel and having each a movable contact, a constant-speed driving-device coupled to the contact of one potentiometer to move it from one end thereof at a uniform rate, a driving-device operating at a rate varying with an electric load coupled to the contact of the other potentiometer to move it from one end thereof at a rate varying with said electric load, an electrical connection between the ends of the potentiometers, means for resetting both contacts to their initial positions at the end of each of a series of periods, means for applying a potential across the potentiometers, a potential divider having an adjustable contact and connected at one end to the movable contact of one potentiometer, means for applying a potential across the potential divider, and means responsive to a difference of voltage connected between the adjustable contact of the potential divider and the movable contact of the other potentiometer.

3. In an apparatus of the class described, the combination of two potentiometers connected in parallel and having each a movable contact, a constant-speed motor-device coupled to the contact of one potentiometer to move it from one end thereof at a uniform rate, a motor-device operable at a rate variable with an electric load coupled to the contact of the other potentiometer to move it from one end thereof at a rate varying with said electric load, an electrical connection between the ends of the potentiometers, means for resetting both contacts to their initial positions at the end of each of a series of periods, means for applying a potential across the potentiometers, a potential divider having an adjustable contact connected between the contact of one potentiometer and the end thereof from which the contact was advanced, a second potential divider having an adjustable contact and connected at one end to the movable contact of the second potentiometer, means for applying a potential across the second potential divider, and means responsive to a difference of voltage connected between the adjustable contacts of the two potential dividers.

4. Apparatus according to claim 3 comprising also a meter connected between the contact of the second potentiometer and the end of that potentiometer from which its contact is advanced, a resistance connected in series between the ends of both potentiometers from which their contacts are advanced and the means for applying potential to them, and a meter connected between an adjustable tapping on the resistance and the adjustable contact of the first potential divider.

5. Mechanism for comparing the rates of closure of two electric contact devices comprising the combination with two electric contact devices that close intermittently, of two escapement mechanisms each comprising a rotatable toothed wheel, means biasing the wheel to rotate continuously in one direction and an electromagnet connected to the associated contact device for energisation thereby when it closes and mounted adjacent the periphery of the wheel with its poles registering alternately with the teeth and tooth spaces of the wheel as the wheel rotates so that the wheel forms part of its magnetic circuit, two resistances connected together as the legs of an electrical bridge, an adjustable contact on each said resistance, means connecting said contacts respectively to the toothed wheels of said escapement mechanisms for adjustment thereby along its resistance, means for applying a potential thereto and means connected across the bridge for differential energisation with the state of balance of the bridge.

6. Mechanism for comparing the rates of operation of two electric contact devices comprising the combination with two change-over contact devices each operable to complete one or other of two circuits alternately, of two escapement mechanisms each comprising a rotatable toothed wheel, means biasing the wheel to rotate continuously in one direction, and two electromagnets connected in the two circuits, respectively, controlled by the associated contact device for energisation when that circuit is completed and mounted adjacent the periphery of the toothed wheel so that the poles of either one magnet will register with teeth of the wheel and the poles of the other magnet will concurrently register with tooth spaces of the wheel, two resistances connected together as the legs of an electrical bridge, an adjustable contact on each said resistance, means connecting said contacts respectively to the toothed wheels of said escapement mechanisms for adjustment thereby along its resistance, means for applying a potential thereto and means connected across the bridge for differential energisation with the state of balance of the bridge.

7. Comparing mechanism according to claim 6 wherein the circuit to each magnet includes a resistance in parallel with the associated contact device to provide for the partial energisation of that magnet when its circuit is not completed by the contact-device.

8. Comparing mechanism according to claim 6, wherein each resistance is formed as a ring and its movable contact is rotatable around the centre of the ring, there is provided in each escapement mechanism a resetting relay arranged to hold itself energised and to open, when energised, the circuits of the magnets of that escapement mechanism and a contact device driven by the toothed wheel in unison with the movable contact and operable to deenergise the relay when the movable contact is in an initial position at one end of the resistance and there is further provided a time switch arranged to energise the resetting relays of both escapement mechanisms at the end of each of a series of equal periods.

BERNARD ANDRÉ VUILLE.

REFERENCES CITED

The following references are of record in the file of this patent:

UNITED STATES PATENTS

| Number | Name | Date |
|---|---|---|
| 1,174,373 | Wright | Mar. 7, 1916 |
| 1,647,316 | Schott et al. | Nov. 1, 1927 |
| 1,936,787 | Gork | Nov. 28, 1933 |
| 2,199,910 | Cunningham | May 7, 1940 |
| 2,232,073 | Montgomery | Feb. 18, 1941 |
| 2,319,625 | Ostrander | May 18, 1943 |
| 2,348,058 | Coates | May 2, 1944 |
| 2,384,792 | Brown | Sept. 18, 1945 |